United States Patent [19]

Sato

[11] 4,203,048
[45] May 13, 1980

[54] COIL SUPPORT FOR DISC ROTOR OF CORELESS MOTOR

[75] Inventor: Masaaki Sato, Hachioji, Japan

[73] Assignee: Olympus Optical Co., Ltd., Japan

[21] Appl. No.: 830,685

[22] Filed: Sep. 6, 1977

[30] Foreign Application Priority Data

| Sep. 14, 1976 | [JP] | Japan | 51-111165 |
| Sep. 14, 1976 | [JP] | Japan | 51-111166 |
| Sep. 25, 1976 | [JP] | Japan | 51-115191 |
| Sep. 25, 1976 | [JP] | Japan | 51-115192 |
| Sep. 27, 1976 | [JP] | Japan | 51-116386 |
| Sep. 27, 1976 | [JP] | Japan | 51-116387 |

[51] Int. Cl.² ............................................. H01L 41/10
[52] U.S. Cl. .................................................... 310/268
[58] Field of Search ............. 310/268, 42, 43, 40 MM

[56] References Cited

U.S. PATENT DOCUMENTS

| 3,435,267 | 3/1969 | Beyersdorf et al. | 310/268 X |
| 3,845,339 | 10/1974 | Merkle et al. | 310/268 X |
| 3,863,336 | 2/1975 | Noto et al. | 310/268 X |
| 3,953,751 | 4/1976 | Merkle et al. | 310/268 X |
| 3,993,920 | 11/1976 | Sato | 310/268 X |
| 4,072,881 | 2/1978 | Ban | 310/268 X |

*Primary Examiner*—Mark O. Budd
*Attorney, Agent, or Firm*—Lerner, David, Littenberg & Samuel

[57] ABSTRACT

A method of manufacturing the rotor of a coreless motor comprises the steps of molding a coil positioning disc integrally with the commutator of the motor, disposing rotor coils on or in the disc, and securing the coils thereto, thereby assembling the coils into the rotor at positions which achieve a dynamic and a magnetic balance of the rotor. In this manner, a balanced rotor is provided.

6 Claims, 23 Drawing Figures

COIL SUPPORT FOR DISC ROTOR OF CORELESS MOTOR

BACKGROUND OF THE INVENTION

The invention relates to the rotor of a small size coreless motor and a method of manufacturing same.

A coreless motor, in particular, that which is used in a small size tape recorder must maintain a constant speed of rotation. In addition, it is also necessary that the rotation be uniform, smooth and stabilized. This requires a dynamic balance of the rotor relative to the axis of rotation thereof. However, in conventional coreless motors of the kind described, a jig is used to assemble rotor coils around the rotary shaft of the motor by a manual operation, and then a molding material is cast to form the rotor. With this procedure, it is very difficult to achieve a satisfactory dynamically balanced rotor.

Before describing the present invention, an example of the prior art will be described with reference to FIGS. 1 to 5, which show a rotor including three coils. A coreless motor 1 is shown as comprising a housing 7 which includes a hollow cylinder 6 and a pair of upper and lower end plates 5a, 5b secured to the opposite ends thereof. A pair of bearings 8a, 8b are centrally fitted in the end plates 5a, 5b to receive a rotary shaft 2 in a rotatable manner. A rotor 4 including a commutator 3, and rotor coils 15a, 15b, 15c (see FIG. 5) is integrally connected with the shaft 2, the lower end of which bears against an abutment 9 secured to the lower end plate at a position beneath the bearing 8b. The upward thrust is countered by the abutment of the upper end face of the commutator 3 against the lower end face of the bearing 8a with a spacer 13 interposed therebetween. The motor also includes a magnet 10 which is secured within the housing 7 so as to be opposite to the upper face of the rotor 4, and a pair of brushes 11a, 11b which are fixedly mounted on the housing 7 for engaging the commutator 3.

Figure 1:
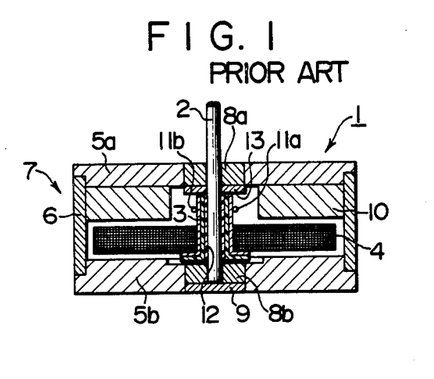
FIG. 1 is a cross section of a coreless motor including a conventional rotor.
Figure 2:
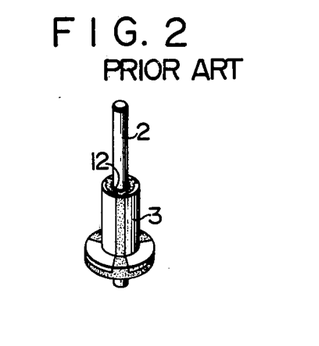
FIG. 2 is a perspective view of an assembly comprising a rotary shaft and a commutator shown in FIG. 1.
Figure 3:
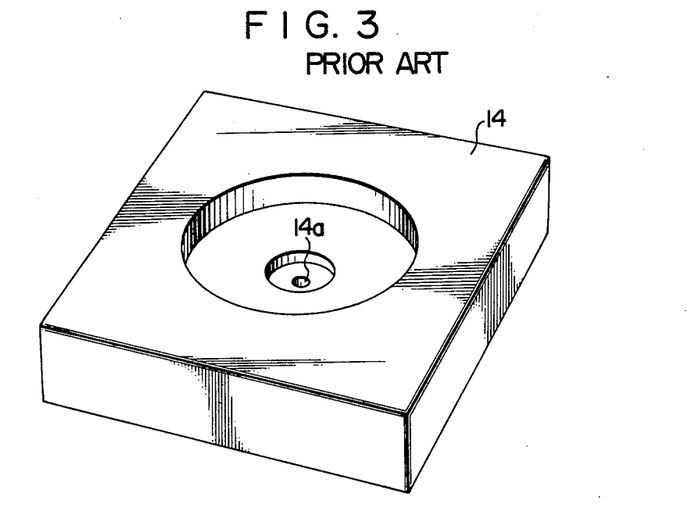
FIG. 3 is a perspective view of a casting jig used in the manufacture of the rotor shown in FIG. 1.
Figure 4A:
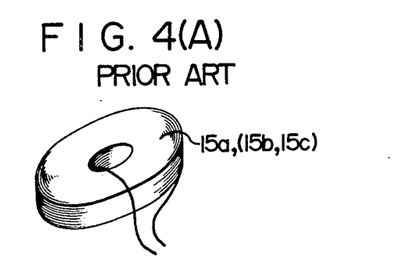
FIGS. 4A and B are perspective views of exemplary coils.
Figure 4B:
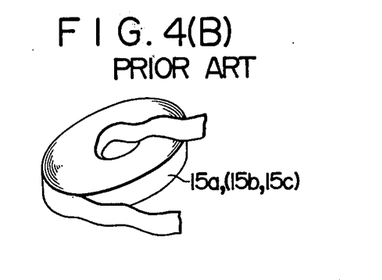
Figure 5:
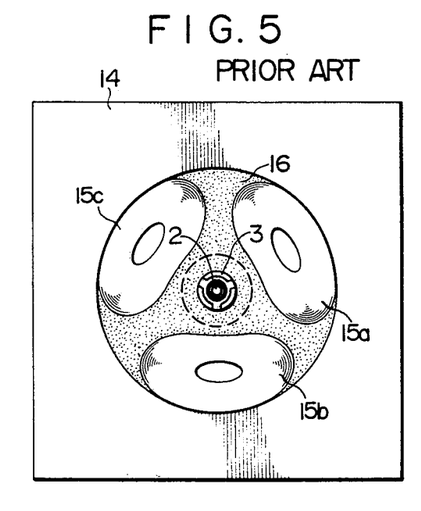
FIG. 5 is a plan view of the casting jig shown in FIG. 3 with coils disposed therein.

In the prior art practice, the manufacturing of the rotor 4 takes place in the manner mentioned below. Initially, the commutator 3 is integrally connected with the rotary shaft 2 in concentric manner, by using an adhesive 12, as shown in FIG. 2. Then the commutator 3 is fitted into a through opening 14a formed centrally in the bottom of a saucer-shaped casting jig 14 shown in FIG. 3. As shown in FIGS. 4A and B, rotor coils 15a, 15b, 15c, which may be formed by a conductive wire or strip, have their opposite ends electrically connected with the commutator 3 as by soldering, and are then disposed as shown in FIG. 5. When the rotary shaft 2, commutator 3 and rotor coils 15a to 15c are disposed in the jig 14 in this manner, a molding material 16 such as epoxy resin is cast into the jig and is caused to set, whereupon the jig 14 is removed to form the rotor 4 complete with the rotary shaft 2 and the commutator 3, as shown in FIG. 1. To achieve a dynamically balanced rotor 3 with respect to the rotary shaft 2, it is necessary that the coils 15a to 15b be disposed at an equal spacing between them within the jib 14, but since the disposition is performed by a manual operation, a movement of the coil or coils on the jig is likely to occur, rendering the positioning operation very difficult. Even if extreme care is exercised and a substantial length of time is devoted to their alignment there is nevertheless much difficulty in obtaining the desired the dynamic and magnetic balance, preventing a smooth rotation of the motor 1.

SUMMARY OF THE INVENTION

It is a first object of the invention to provide a rotor including a coil positioning disc integral with the commutator to locate coils properly thereon, thus achieving a dynamic and a magnetic balance.

It is a second object of the invention to provide a rotor including a coil positioning disc, the periphery of which is formed with coil receiving chambers which are substantially in conformity to the configuration of rotor coils and in which the latter is located as referenced to the periphery thereof by using urging members, thus further improving the dynamic balance of the rotor.

It is a third object of the invention to provide a rotor including a coil positioning disc which is formed with chambers for receiving a plurality of balancing members which provide a precise adjustment of the dynamic balance of the rotor.

It is a fourth object of the invention to provide a rotor including a coil positioning disc which is formed with resilient support arms for resiliently restraining coils, thus facilitating the proper positioning of the coils.

It is a fifth object of the invention to provide a rotor including a coil positioning disc which has resistors such as baked resistors disposed along the periphery of a commutator on at least one of the major surfaces of the disc for connection between commutator segments, thus facilitating the electrical interconnection between the coils, commutator and resistors.

It is a sixth object of the invention to provide a rotor including a coil positioning disc which is formed by a plastic deformation of a sheet of synthetic resin, thus reducing the diameter, thickness and weight of the rotor.

DESCRIPTION OF EMBODIMENTS

Figure 6:
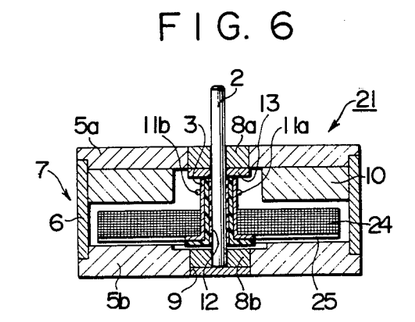
FIG. 6 is a cross section of a coreless motor incorporating the rotor according to the invention.

Referring to FIG. 6, there is shown a coreless motor 21 incorporating the rotor according to the invention. The coreless motor 21 is generally similar to the motor shown in FIG. 1 except for the construction of the rotor 4. Therefore, other parts than the rotor will be designated by like numerals and will not be described. In the embodiment shown, it is assumed that the motor has three poles or three rotor coils.

Figure 7:
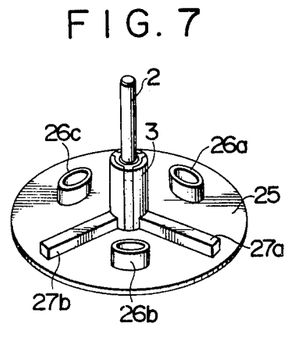
FIG. 7 is a perspective view of a coil positioning disc used in the invention.

Specifically, the rotor 24 according to the invention is formed by employing a coil positioning disc 25, as shown in FIG. 7. The disc 25 comprises a thin plastic disc of the same diameter as the rotor 24, and has three partitioning walls 27a, 27b, 27c on its upper surface which divide the entire periphery into three equal sectorial parts. A plurality of elliptical coil guides 26a, 26b, 26c are integrally molded with the disc at an equal radial distance from the center thereof on each of bisecting lines of the sectors, the guides being located slightly further toward the periphery than the center of the radial line. The walls 27a, 27b, 27c serve as the means for separating and positioning respective coils 29a, 29b, 29c (see FIG. 9), and also serve a reinforcing ribs for the disc 25 which comprises a relatively thin sheet.

The coil guides 26a, 26b, 26c are formed to a configuration which permits the inner opening of the coils 29a to 29c to be fitted thereon. The height of the walls 27a to 27c and the coil guides 26a to 26c is chosen substantially equal to the thickness of the coils.

Figure 8:
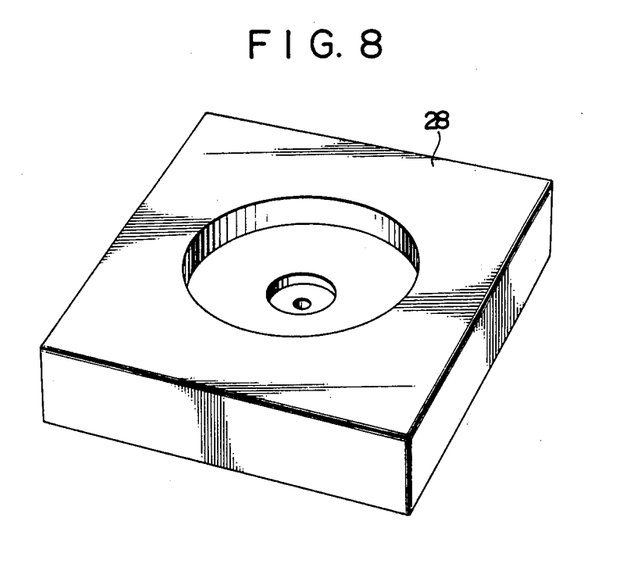
FIG. 8 is a perspective view of a casting jig in which the coil positioning disc of FIG. 7 is fitted.
Figure 9:
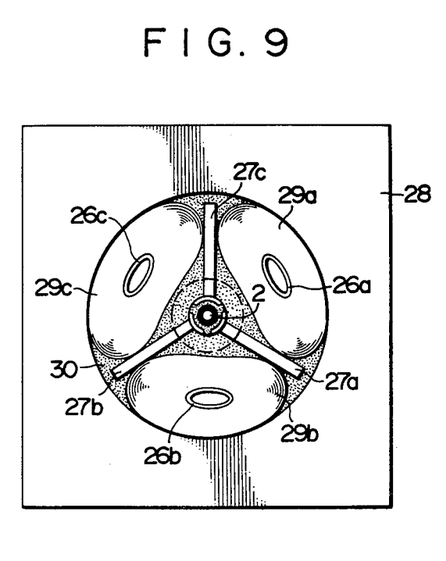
FIG. 9 is a plan view of the jig with coils disposed therein.

Referring to the manufacture of the disc 25 more specifically, it is molded by casting a molding material around an assembly comprising rotary shaft 2 and commutator 3, as shown in FIG. 7. The molded assembly is then fitted into a saucer-shaped casting jig 28 having an inner diameter substantially equal to that of the disc 25 and a depth of its sidewall substantially equal to that of the coils 29a to 29c. The ends of the coils are connected with the commutator 3 as by soldering and the coils are inserted into the jig 28 so that their inner openings engage the coil guides 26a to 26c. In this manner, the coils are automatically positioned at positions which are symmetrical with respect to the rotary shaft 2, as a result of their engagement with the walls 27a to 27c, coil guides 26a to 26c and the peripheral wall of the jig 28, thus achieving a dynamic balance. A casting material 30 is poured into the jig 28 under this condition. When it is removed after the setting of the material, there is provided a rotor 24 having a dynamic and a magnetic balance. When it is incorporated into the motor 21, rotor 24 is capable of a uniform and smooth rotation. It should be understood that while the coils has been secured by pouring the casting material into the jig, the use of the jig may be dispensed with by applying an adhesive to the coils to fix them to the disc. Also, it should be understood that the number of coils is not limited to three, but that the number of poles may be either increased or decreased.

Figure 10:
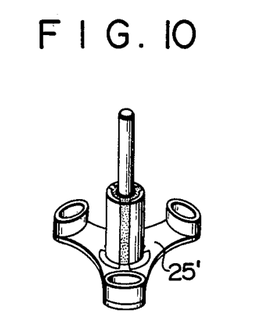
FIG. 10 is a perspective view of another form of coil positioning disc.

The coil positioning disc or member may have any configuration provided it is capable of properly determining the coil position on the rotor. By way of example, unnecessary portions of the disc may be removed, as shown in FIG. 10, and the entire assembly cast into a molding material to reduce the total weight of the rotor. It is also to be noted that the injection molding may be equally used.

Whenever the winding wire has a uniform diameter and the winding process is well controlled, the outer configuration of the coils is shaped in a uniform manner, so that the coil positioning may be referenced to their outer configuration to achieve a high precision in locating the coils. However, when the wire diameter varies or the winding process is not satisfactorily controlled, the outer configuration of the coils varies from coil to coil. The centrifugal force increases with the coil dimension, so that when coils having varying outer configuration are used, it is difficult to achieve a dynamic balance. In view of these considerations, it will be most suitable for the purpose of balancing to choose that area of each coil which is most remote from the rotary shaft as reference and place such area in abutment against the periphery of the rotor, thus minimizing the imbalance.

Figure 11:
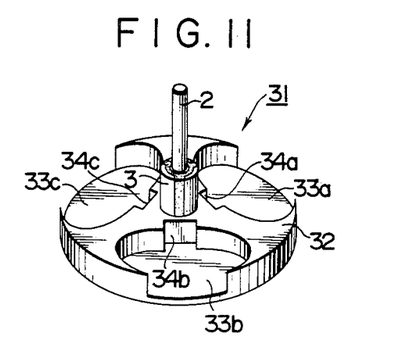
FIG. 11 is a perspective view of a further form of coil positioning member which includes coil receiving chambers.
Figure 12:
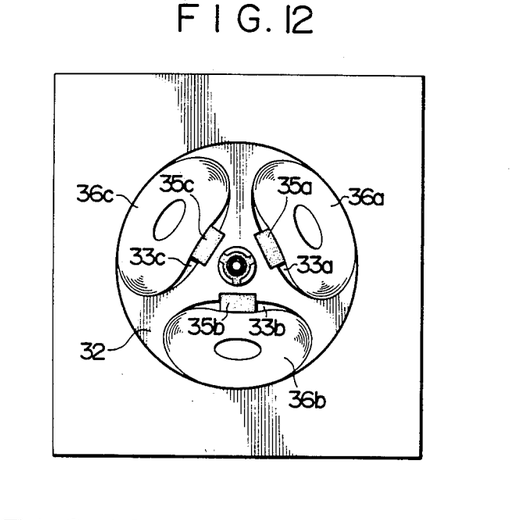
FIG. 12 is a plan view of the coil positioning member shown in FIG. 11 with coils disposed therein.
Figure 13:
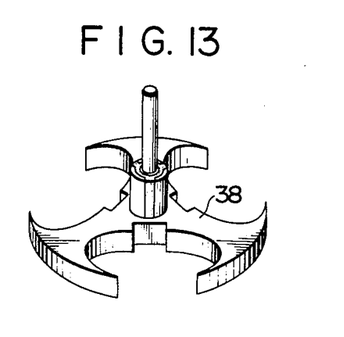
FIG. 13 is a perspective view of a modification of the coil positioning member shown in FIG. 11.

Referring to FIGS. 11 to 13, there is shown another form of the rotor wherein similar parts of the coreless motor which correspond to those described above are designated by like reference numerals, without repeating their description. In FIG. 11, there is shown a rotor 31 which includes a coil positioning member 32. The member 32 is molded from a plastic material and has a commutator 3 integrally secured thereto. The member 32 is formed with three coil chambers or recesses 33a, 33b, 33c at equiangular positions, these coil chambers being slightly greater than the size of individual coils and open along part of the periphery and the top. Grooves 34a, 34b, 34c are formed in a sidewall of the individual coil chambers which are nearer the center of the disc 32 for receiving urging members 35a, 35b, 35c (see FIG. 12). The members 35a to 35c each comprise a small piece of a resilient material such as rubber or sponge, and are inserted into the grooves 34a to 34c when the outer diameter varies from coil to coil. When inserted into the grooves, these urging members act to urge the respective coils 36a to 36c (see FIG. 12) against the outer periphery of the coil chambers, thus locating them as referenced to the outer periphery of the rotor 31.

Coils 36a to 36c have their opposite ends connected with the commutator 3 as by soldering, and are inserted into the coil chambers 33a to 33c, respectively, as shown in FIG. 12. When a variation in the outer diameter of the coils is rather large, urging members 35a to 35c are inserted into the grooves to urge them against the outer periphery of the disc 32, thus referencing them to such periphery. This achieves a high precision in the positioning of and a physical balance of the coils on the disc 32 despite a degree of variation in the size and/or shape of the individual coils.

The configuration of the coil positioning member 32 is not limited to that shown in FIG. 11, but any configuration may be used which enables the coils to be referenced to the periphery of the rotor. By way of example, FIG. 13 shows a modification in which the coil chambers are formed to extend through the disc. This reduces the thickness of the rotor, thus allowing a flat motor construction with a reduced weight. In this instance, the coils can be secured to the disc 38 by casting.

Figure 14:
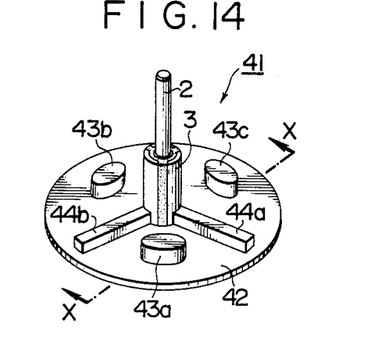
FIG. 14 is a perspective view of still another form of coil positioning disc which is provided with recesses for receiving balancing members.
Figure 15:
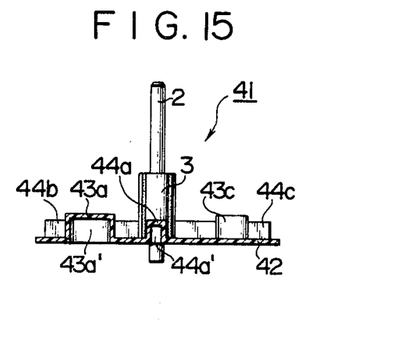
FIG. 15 is a cross section taken along the line X—X shown in FIG. 14.
Figures 16, 18:
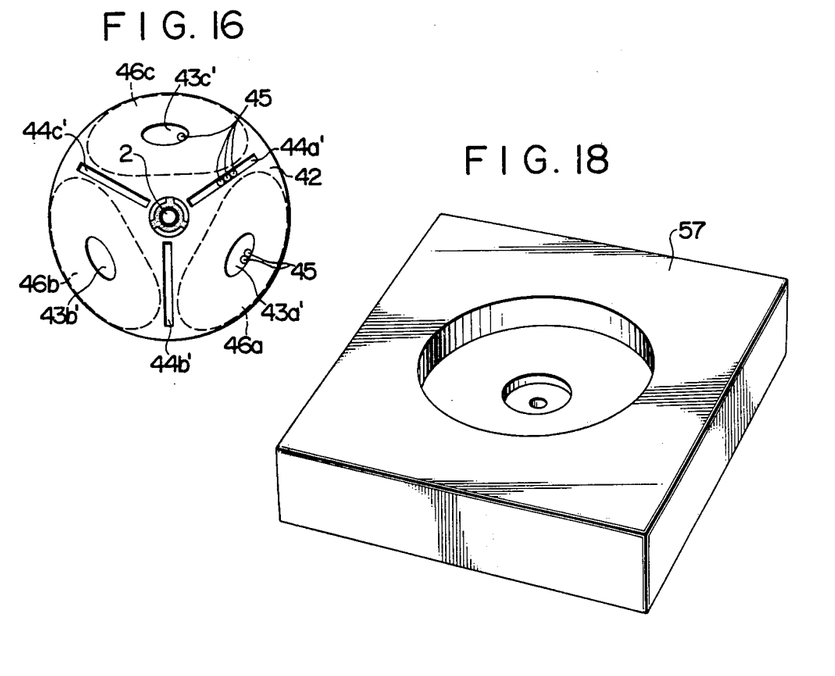
FIG. 16 is a rear view of the disc shown in FIG. 14.
FIG. 18 is a perspective view of a casting jig in which the member of FIG. 17 is fitted.

FIGS. 14 to 16 show another arrangement of a rotor 41 including a coil positioning disc 42. Again, other parts of the coreless motor will not be specifically described. The coil positioning disc 42 is generally similar to the disc 25 shown in FIGS. 6 to 9. Specifically, it is provided with coil guides 43a to 43c for locating coils 46a to 46c thereon by engagement with their inner opening, and also has partitioning walls 44a to 44c which properly locate the periphery of the individual coils. These coil guides and walls may be formed by a vacuum molding of a softened sheet of vinyl chloride, for example, which constitutes the disc 42. In this manner, as shown in FIGS. 15 and 16, there can be formed recesses 43'a to 43'c and 44'a to 44'c in alignment with the guides and the walls, in the opposite or rear side of the disc 42. In the present embodiment, these recesses are utilized as chambers for receiving balancing members 45 which are advantageously employed to achieve a precise dynamic balance of the rotor 41. The balancing member 45 may comprise a small ball of lead, for example, and a suitable number of them may be adhesively secured inside the recesses. In this manner, a precise balancing of the rotor 41 can be achieved in a simple manner without requiring an increased processing step. The use of such balancing member is not limited to the present embodiment, but may be utilized in any other embodiment as by forming suitable recesses in the coil positioning disc 32 or 38 in regions other than the coil receiving chambers.

Figure 17:
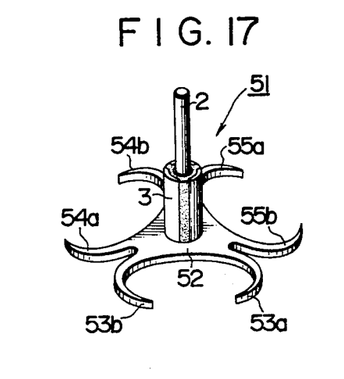
FIG. 17 is a perspective view of a still further form of coil positioning member having resilient support arms.
Figure 19:
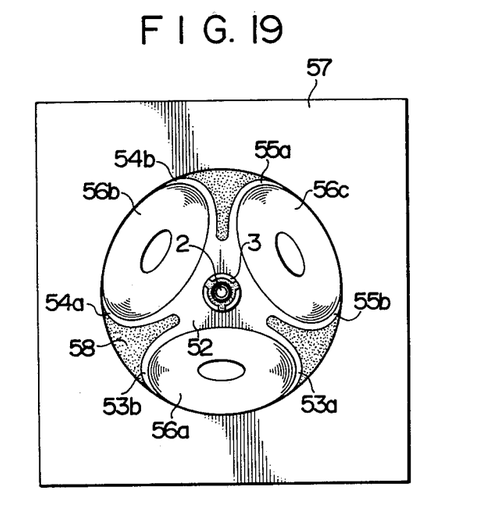
FIG. 19 is a plan view of the jig shown in FIG. 18 and in which the coil positioning member of FIG. 17 with coils disposed therein is fitted.

Referring to FIGS. 17 to 19, there is shown a rotor 51 including a coil positioning member 52 which is molded from an elastic plastic material integrally with the rotary shaft 2 and commutator 3 of a coreless motor. As shown in FIG. 17, the member 52 has three pairs of coil restraining support arms 53a, 53b, 54a, 54b, 55a, 55b. Each pair of support arms extend generally in the radial direction initially and then toward each other to retain one of coils 56a, 56b, 56c between them. The outer diameter of the member 52 defined by these arms is substantially equal to that of the rotor 51. As shown in FIG. 19, the coils can be automatically positioned and resiliently restrained in position. The opposite ends of the coils are electrically connected with the commutator 3 to complete the rotor 51. In order to firmly secure the coils in position, the member 52 may be disposed in a saucer-shaped casting jig 57 shown in FIG. 18, into which a casting material 58 such as epoxy resin may be poured and allowed to set in order to secure the entire rotor together.

Figure 20:
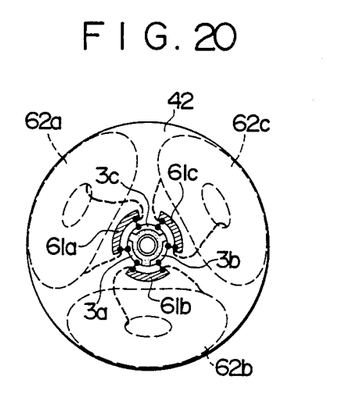
FIG. 20 is a rear view of a coil positioning disc, illustrating the formation of resistors.
Figure 21:
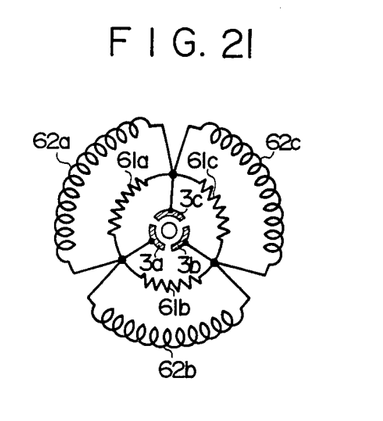
FIG. 21 is a wiring diagram of the rotor shown in FIG. 20.
Figure 22:
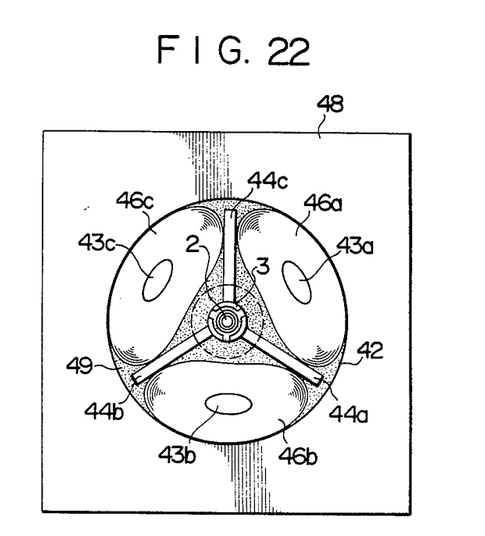
FIG. 22 is a plan view of a jig with a coil positioning disc with coils fitted therein, the disc being formed by a plastic deformation of a sheet.

Referring to FIGS. 20 to 21, there is shown a further form of rotor of a coreless motor. The coil positioning disc or member of this rotor is the same as the coil positioning disc 42 shown in FIG. 14. FIG. 20 is a rear view of the disc, which shows three conductive segments 3a to 3c of the commutator 3. Arcuate resistors 61a to 61c are disposed around the exposed commutator segments 3a to 3c, and are formed in strip form by baking powder resistor material as shown. The opposite ends of the resistors 61a to 61c and of coils 62a to 62c disposed on the opposite side of the disc 42 are simultaneously connected with the commutator segments 3a to 3c as by soldering. FIG. 21 shows a wiring diagram of the resulting connection. It will be seen that the resistors 61a to 61c are connected between the segments 3a to 3c. The provision of these resistors requires no additional space and no additional step since the soldering is used in the conventional assembly. While the resistors are disposed on the backside of the disc 42 in the embodiment described above, they may be formed on the opposite side of the disc. Similarly, the resistors may be formed on both sides of the disc. It should be understood that the configuration of the resistors is not limited to arcuate shape as shown, but may be arranged in any desired configuration.

In each of the embodiments shown in FIGS. 7, 11 and 14, it will be appreciated that the rotor has a thickness which is the total of the thickness of the coil positioning disc or member plus the thickness of the coils.

In order to meet the requirement of a thin coreless motor which is used in a miniature tape recorder, for example, the casting material which forms the rotor may be removed by cutting the bottom surface thereof to a minimum thickness required, thus achieving a rotor thickness which is substantially the same as the coil thickness in the arrangements of FIGS. 7 and 11. The disc 42 shown in FIG. 4 inherently has a minimized thickness as a result of a plastic deformation of the synthetic resin sheet.

What is claimed is:

1. In a rotor of a coreless motor, said rotor being rotatable about an axis of rotation and including a commutator, rotatable about said axis of rotation, and a plurality of coils, the improvement comprising:
    a coil positioning member formed integrally with said commutator and extending radially outwardly therefrom, said coil positioning member including a plurality of positioning means, one for each of said coils, said positioning means being located at predetermined locations on said coil positioning member for automatically and positively positioning said coils with respect to said axis of rotation so as to substantially balance said rotor both dynamically and magnetically, said coil positioning member including a plurality of arms and said positioning means including a plurality of guides, each of said guides being carried by a corresponding one of said arms.

2. A rotor according to claim 1, wherein the angle between the radially extending centerlines of adjacent arms is the same for each pair of adjacent arms and each of said guides is centered on the centerline of said corresponding one of said arms.

3. A rotor according to claim 2, wherein each of said guides has a shape which generally matches the inner shape of a corresponding one of said coils.

4. In a rotor of a coreless motor, said rotor being rotatable about an axis of rotation and including a commutator, rotatable about said axis of rotation, and a plurality of coils, the improvement comprising:
    a coil positioning member formed integrally with said commutator and extending radially outwardly therefrom, said coil positioning member including a plurality of positioning means, one for each of said coils, said positioning means being located at predetermined locations on said coil positioning member for automatically and positively positioning said coils with respect to said axis of rotation so as to substantially balance said rotor both dynamically and magnetically, said coil positioning member including a substantially flat disc and said positioning means including (i) a plurality of recesses formed in one side of said disc, the radially innermost portion of each of said recesses having a radially inwardly extending groove, (ii) a plurality of openings in the outer peripheral edge of said disc, each of said openings communicating with a corresponding one of said recesses, and (iii) a plurality of resilient means, one for each of said recesses, one end of each of said resilient means being positioned in a corresponding groove and the opposite end of each of said resilient means engaging an adjacent portion of a corresponding one of said coils for urging said corresponding one of said coils radially outwardly toward a corresponding one of said openings.

5. In a rotor of a coreless motor, said rotor being rotatable about an axis of rotation and including a commutator, rotatable about said axis of rotation, and a plurality of coils, the improvement comprising:
a coil positioning member formed integrally with said commutator and extending radially outwardly therefrom, said coil positioning member including a plurality of positioning means, one for each of said coils, said positioning means being located at predetermined locations on said coil positioning member for automatically and positively positioning said coils with respect to said axis of rotation so as to substantially balance said rotor both dynamically and magnetically, said positioning means including a plurality of pairs of resilient arms, each of said pairs of arms engaging a corresponding one of said coils.

6. A rotor according to claim 5, wherein the arms of each of said pairs of arms are shaped so as to generally match the outer shape of said corresponding one of said coils.

* * * * *

UNITED STATES PATENT AND TRADEMARK OFFICE
CERTIFICATE OF CORRECTION

PATENT NO. : 4,203,048
DATED : May 13, 1980
INVENTOR(S) : Masaaki Sato

It is certified that error appears in the above—identified patent and that said Letters Patent is hereby corrected as shown below:

Column 1, line 62, change "jib" to --jig--.

Column 1, line 68, delete "the" (second occurrence).

Column 3, line 44, change "a" to --as--.

Signed and Sealed this

Twenty-fourth Day of March 1981

[SEAL]

Attest:

RENE D. TEGTMEYER

Attesting Officer     Acting Commissioner of Patents and Trademark